H. A. COLBY.
FRUIT PICKER.
APPLICATION FILED SEPT. 21, 1912.
1,117,332.
Patented Nov. 17, 1914.
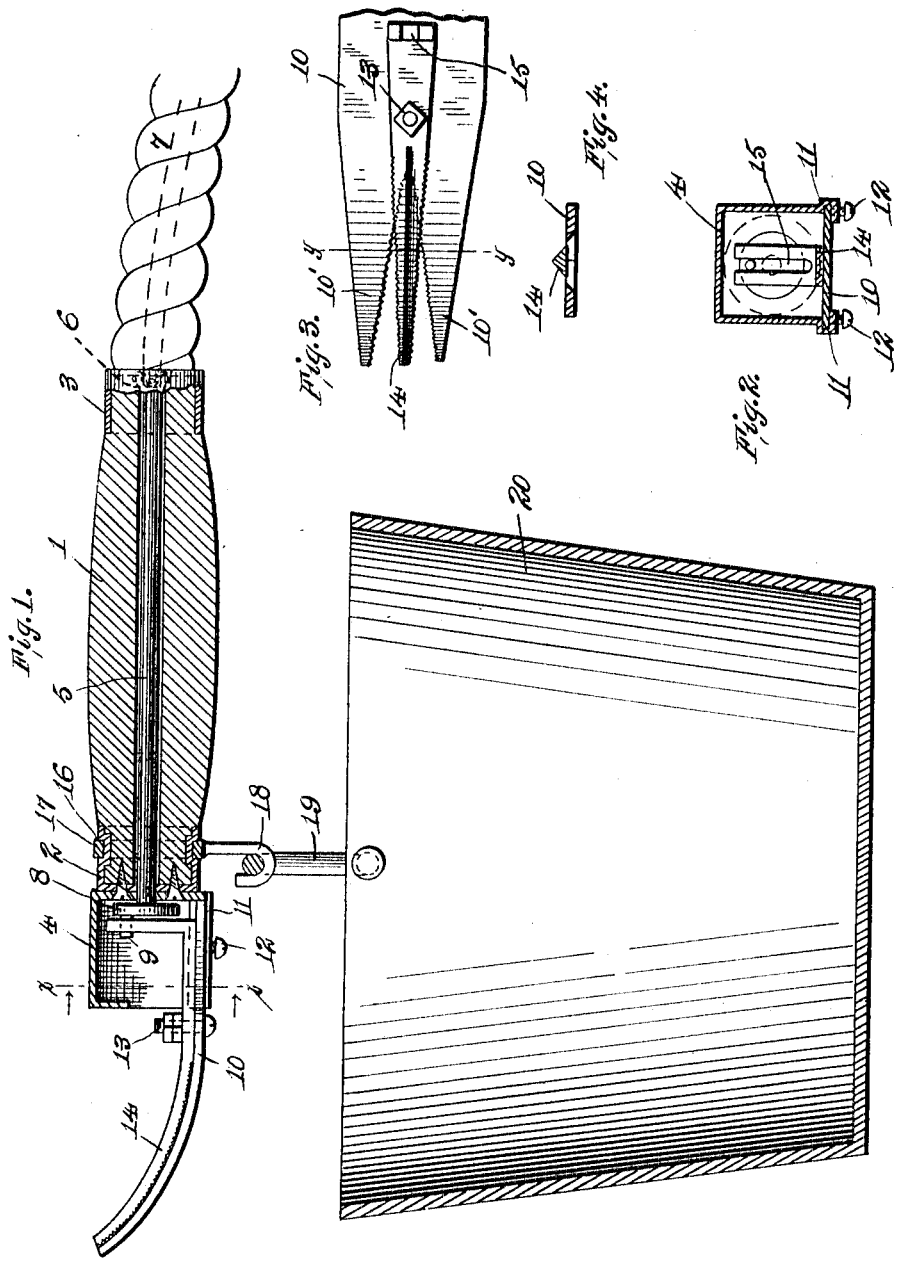
Witnesses:
O. A. Olson
B. J. Richards
Inventor:
Harold A. Colby
by Joshua R. H. Ross
his Attorney.

UNITED STATES PATENT OFFICE.

HAROLD A. COLBY, OF SPRING GROVE, ILLINOIS.

FRUIT-PICKER.

1,117,332. Specification of Letters Patent. Patented Nov. 17, 1914.

Application filed September 21, 1912. Serial No. 721,619.

*To all whom it may concern:*

Be it known that I, HAROLD A. COLBY, a citizen of the United States, and a resident of the city of Spring Grove, county of McHenry, and State of Illinois, have invented certain new and useful Improvements in Fruit-Pickers, of which the following is a specification.

My invention relates to improvements in fruit pickers or gatherers and has for its object the production of a device of this character designed for use especially in picking or gathering cherries.

A further object is the production of a device as mentioned which will be durable and economical in construction, and through the medium of which fruit of the character mentioned may be picked with ease and expedition.

Other objects will appear hereinafter.

The invention consists in the combinations and arrangements of parts hereinafter described and claimed.

The invention will be best understood by reference to the accompanying drawings forming a part of this specification and in which, Figure 1 is a substantially central longitudinal section of a fruit picker embodying my invention, Fig. 2 is a transverse section taken on substantially line *x—x* of Fig. 1, Fig. 3 is a top plan view of the outer end portion of the cutting member of the device, and Fig. 4 is a section taken on line *y—y* of Fig. 3.

The preferred form of construction as illustrated in the drawings comprises an elongated handle 1 which is provided at its ends with reinforcing metal ferrules 2 and 3. Secured rigidly to the ferrule 2 is a rectangular housing 4. Arranged axially in the handle 1 is a rotary shaft 5, one end of which is connected as at 6 with a conventional flexible shaft 7, the latter, when in use, being driven through the medium of an electric motor which will be carried upon the body of the operator, said motor being electrically connected with any suitable source of power supply which is convenient and accessible. A switch will be provided in the circuit of said motor so as to secure operation and the cessation of the shaft 5 when desired.

Provided at the front end of the shaft 5 within the housing 4 is a crank consisting of a disk 8 secured to said shaft and a crank pin 9 projecting from said disk. Arranged in one side of the housing 4 is a relatively stationary cutter blade 10, the rearward end of said blade being mounted in grooves 11 which are formed in the opposite edges of said housing, as clearly shown in Fig. 2, set screws 12 serving to releasably lock said blade in position in said grooves. The arrangement is such, as will be observed, that said blade may be readily and expeditiously detached for sharpening or otherwise repairing or replacing the same. Fulcrumed at 13 upon the upper side of blade 10 is a relatively movable cutter blade 14, the rearward angularly disposed end of said blade 14 being bifurcated as at 15 for engagement with crank pin 9 and so that rotation of shaft 5 will effect oscillation of said movable blade. The blade 14 is provided with cutting edges at its opposite sides, as shown in Fig. 4, for operation with cutting edges which are provided at the inner sides of cutter arms 10′ which are formed through bifurcation of the outer end of blade 10. With this arrangement it will be seen that an efficient cutting element is constituted, the shearing cut which results from the arrangement of the cutting blades as set forth being of great efficacy. Said cutting edges are serrated as shown in order to prevent slipping of the fruit stems from between the cutting edges during operation of the cutters. The outer ends of the cutter blades are preferably curved as shown in order to adapt the same to more readily find their way into engagement with the stems of the fruit.

Rotatably mounted in a circumferential groove 16 formed in ferrule 2 is a ring 17 provided at one side with a hook 18. The hook 18 is adapted for engagement with the bail 19 of a suitable receptacle 20 for receiving the fruit as the same is severed by the device. The ring is rotatably mounted in the groove 16 so that the cutting blades may be turned in any direction to engage the stems without tilting the receptacle 20.

With a device as set forth the picking of fruit such as cherries may be effected with the greatest ease and expedition. The device is simple and economical in construction so that the same will not readily get out of order. The blades are so mounted that the same may be readily detached for sharpening and the device is of light construction so as to be readily handled by the operator.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A fruit picker comprising a handle, cutting blades thereon, a ring rotatably mounted on said handle adjacent the blades and a hook on said ring to support a receptacle, substantially as described.

2. A fruit picker comprising a handle, a housing secured to the end of said handle and comprising an end wall fixed to the handle, a top wall and parallel side walls, the lower edges of said side walls being provided with parallel grooves on their inner faces, a blade having a shank forming the bottom of said housing and having its edges arranged in said grooves, means for securing said blade in position, a second blade pivotally mounted on the first mentioned blade and means within said housing for operating the last mentioned blade, substantially as described.

In testimony whereof I have signed my name to this specification in the presence of two subscribing witnesses.

HAROLD A. COLBY.

Witnesses:
FRANK G. COLBY,
W. E. COLBY.

Copies of this patent may be obtained for five cents each, by addressing the "Commissioner of Patents, Washington, D. C."